United States Patent
Bostrom et al.

(10) Patent No.: US 7,379,743 B2
(45) Date of Patent: May 27, 2008

(54) PROVIDING NAVIGATION SERVICES BASED ON SUBSCRIBER INPUT LOCATION INFORMATION STORED IN A TELECOMMUNICATION NETWORK

(75) Inventors: Kevin L. Bostrom, Naperville, IL (US); Jerome W. Graske, St. Charles, IL (US); Gerald W. Pfleging, Batavia, IL (US); Gregory M. Vaudreuil, Dallas, TX (US); George Paul Wilkin, Bolingbrook, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 1157 days.

(21) Appl. No.: 10/609,841

(22) Filed: Jun. 30, 2003

(65) Prior Publication Data

US 2004/0266456 A1 Dec. 30, 2004

(51) Int. Cl.
*H04Q 7/20* (2006.01)

(52) U.S. Cl. ............................. 455/456.2; 455/456.3; 455/457; 701/1; 701/200; 701/207; 342/357.07; 342/357.09

(58) Field of Classification Search ............. 455/404.2, 455/412.1, 412.2, 414.1, 414.2, 414.3, 415, 455/456.1, 456.2, 456.3, 457; 342/357.07–357.09; 701/1, 200, 207

See application file for complete search history.

(56) References Cited

U.S. PATENT DOCUMENTS

| | | | | |
|---|---|---|---|---|
| 5,485,163 A | * | 1/1996 | Singer et al. | 342/457 |
| 6,405,125 B1 | * | 6/2002 | Ayed | 701/200 |
| 6,407,698 B1 | * | 6/2002 | Ayed | 342/357.07 |
| 6,992,583 B2 | * | 1/2006 | Muramatsu | 340/539.32 |
| 2003/0154476 A1 | * | 8/2003 | Abbott et al. | 725/37 |
| 2004/0199631 A1 | * | 10/2004 | Natsume et al. | 709/225 |
| 2006/0092002 A1 | * | 5/2006 | Finkelstein | 340/426.19 |

* cited by examiner

*Primary Examiner*—Binh K. Tieu

(57) ABSTRACT

A node in the telecommunication network supports location and direction services that are especially suited for wireless subscribers. Location coordinates such as determined by the global positioning satellite system are entered by a subscriber from the location to be marked. The node stores the coordinates and compares the marked location to the current coordinates of a subscriber making a request for directions to find the first location, e.g. the subscriber's parked car. The node provides the requesting subscriber with directions for proceeding from the current location to the first location. Subscribers other than the subscriber entering the location coordinates may also access the stored location information and obtain directions to the marked location to facilitate a meeting of subscribers at a location previously marked by a subscriber.

8 Claims, 6 Drawing Sheets

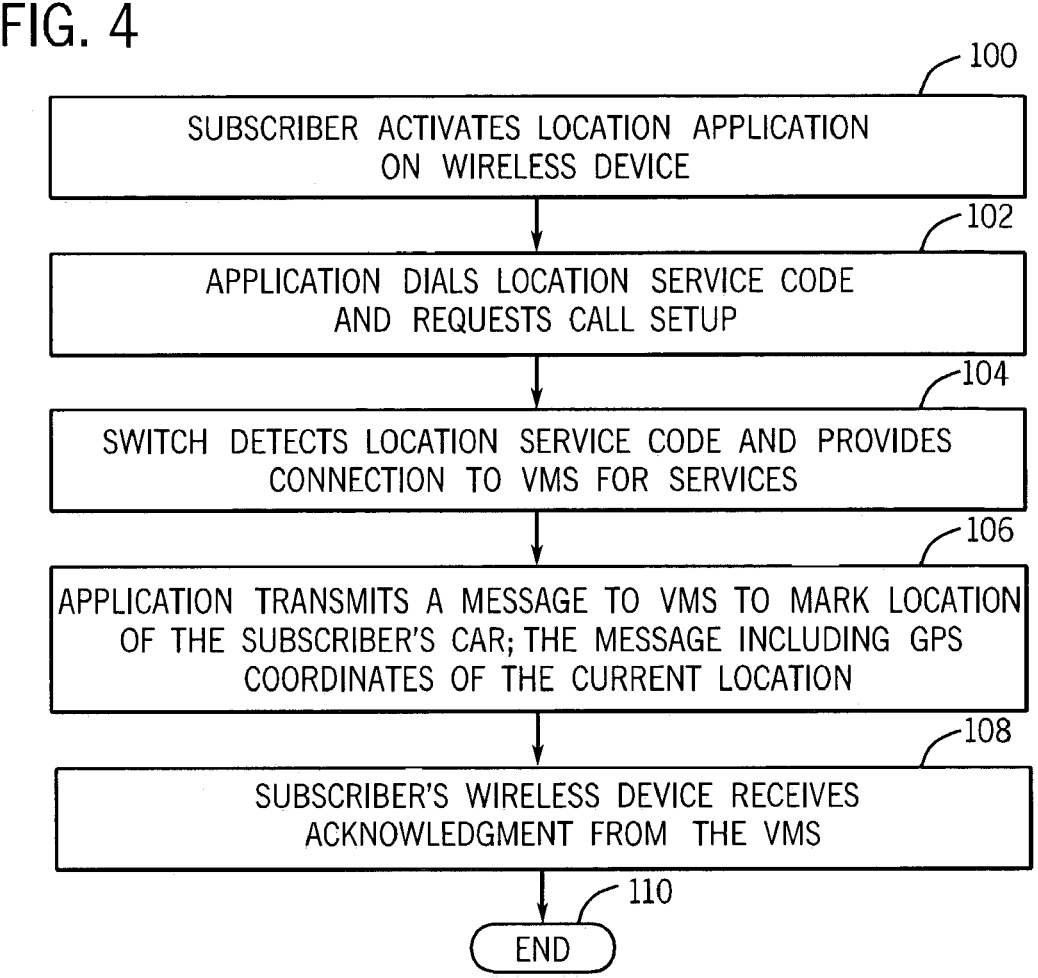
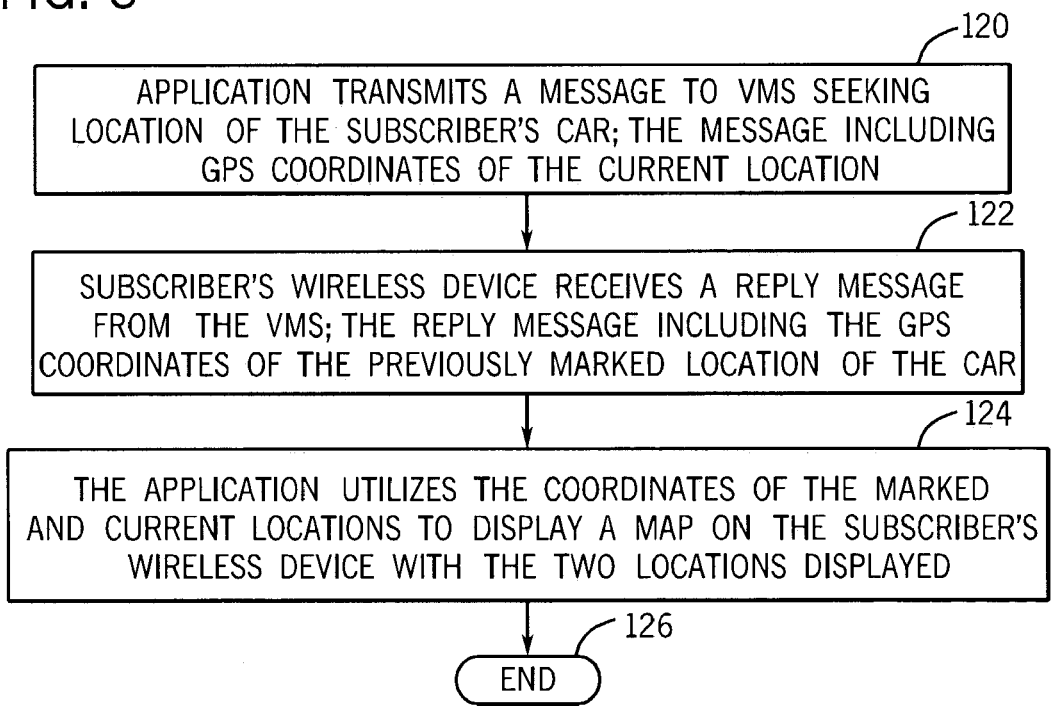

PROVIDING NAVIGATION SERVICES BASED ON SUBSCRIBER INPUT LOCATION INFORMATION STORED IN A TELECOMMUNICATION NETWORK

BACKGROUND

This invention is generally directed to systems that provide information about the location of a user, and more specifically directed to providing location information via a telephony system in which location data is stored remote from the user and entered under the control of the user.

There are a variety of ways to determine a position of a user. Commonly known ways include the use of triangulation to locate a radio frequency signal, long range aid to navigation (LORAN) where available, and the use of the global positioning satellite (GPS) system to provide latitude, longitude and elevation coordinates. A handheld GPS receiver is capable providing a user with accurate location coordinates that indicate the present position of the receiver. Further, a current position of the receiver can be marked, i.e. stored in memory of the receiver, for later use. Many GPS receivers provide navigational information permitting the user to travel from a current location to a previously marked location. Such GPS systems continue to be used successfully and provide navigational assistance to users. Since such systems normally rely upon previously stored location information in the receiver to provide navigational assistance to return to a prior location, this limits the ability of a user to share location and navigation instructions with others that do not have access to the user's receiver. Also it is inconvenient to always carry a standalone GPS receiver in case directions and/or navigation is desired.

SUMMARY OF THE INVENTION

It is an object of the present invention to provide an improved method for utilizing remotely stored position information in a telephony network to provide directions for subscribers.

In accordance with embodiments of the present invention, a node in the telecommunication network supports location and direction services that are especially, but not exclusively, suited for wireless subscribers. Location coordinates such as determined by the global positioning satellite system are entered by a subscriber from the location to be marked by making a telephone call request. The node stores the coordinates and compares the marked location to new current coordinates of a subscriber making a request for directions to find the first location, e.g. the subscriber's parked car. The node provides the subscriber with directions for proceeding from the current location to the first location upon receiving a telephone call requesting such information. Subscribers other than the subscriber who initially entered the location coordinates may also access the stored location information via a telephone call and obtain directions to the marked location to facilitate a meeting of subscribers at a location previously marked by a subscriber.

BRIEF DESCRIPTION OF THE DRAWINGS

FIG. 4 is a flow diagram illustrating steps in accordance with another embodiment of the present invention for marking a location.

FIG. 5 is a flow diagram illustrating steps in accordance with another embodiment of the present invention for locating a previously marked location.

DETAILED DESCRIPTION

Figure 1:
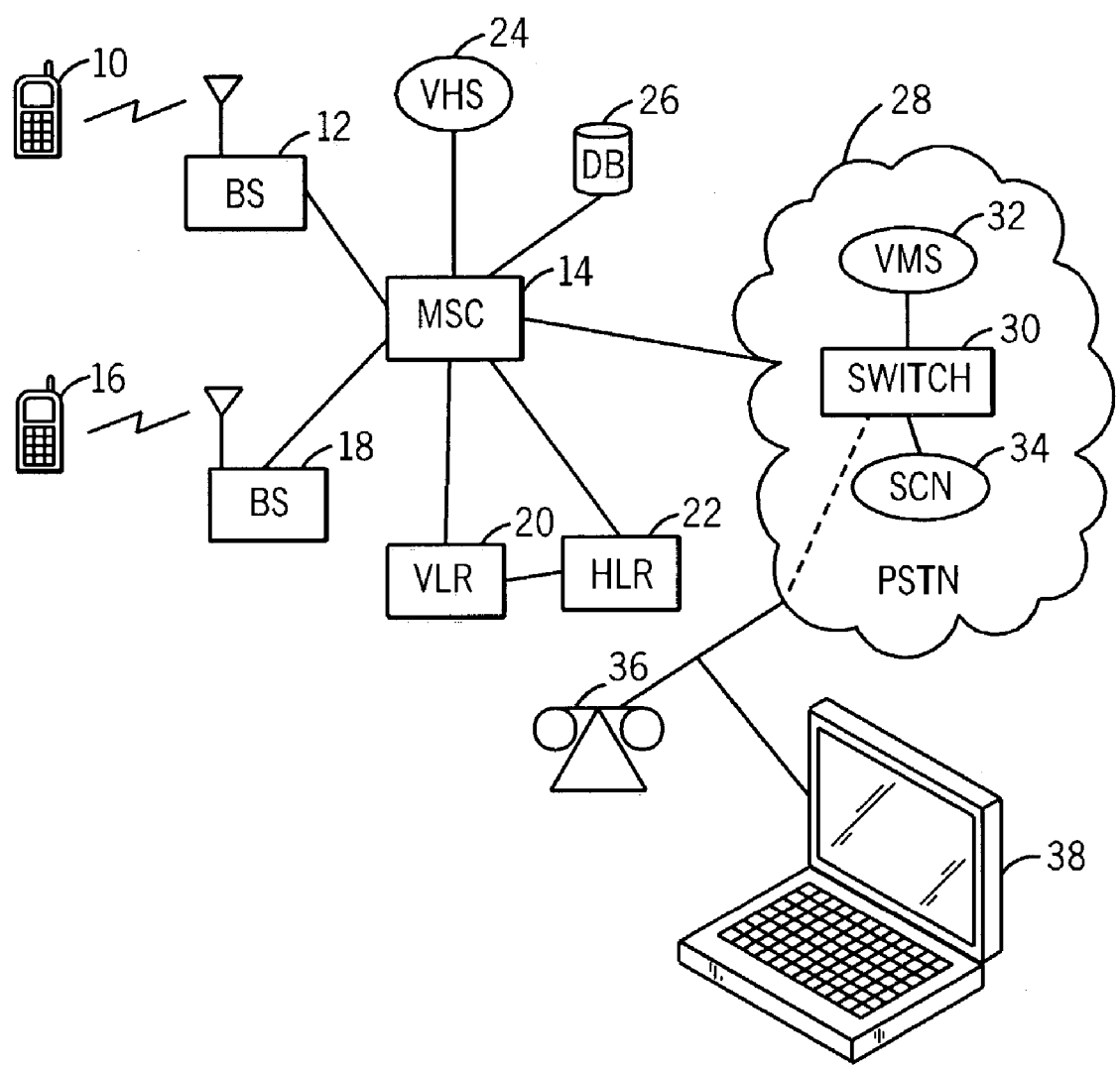
FIG. 1 is a block diagram illustrating a communication network suited for supporting an embodiment of the present invention.

Referring to FIG. 1, the exemplary network includes a wireless communication device 10 that provides a user with two-way wireless communications. The user of device 10 and the device itself will both be referred to by the reference number associated with the device; it will be apparent to the reader based on the context of whether the user or the device is intended. Communication device 10 can comprise any wireless device such as an analog cellular telephone, digital cellular telephone, a wireless device such as a personal computer or personal digital assistant with a wireless modem, a wireless device that supports short messaging service (SMS) communications, etc. In addition to its communication capabilities, communication device 10 includes a means for establishing its location such as a GPS receiver. A base station (BS) 12 supports wireless communications with device 10 and is connected to a mobile switching center (MSC) 14 that provides switching and control functions with regard to wireless calls. Another user employs wireless device 16 for wireless communications as supported by base station 18 and the MSC 14. The device 16 also includes a means for establishing its location such as a GPS receiver. User 16 and base station 18 are merely exemplary of a plurality of wireless subscribers that utilize corresponding wireless devices supported by a plurality of base stations. The MSC 14 is capable of supporting a plurality of base stations and the corresponding associated wireless subscribers.

The MSC 14 is coupled to and supported by peripheral nodes. A voice messaging system (VMS) 24, such as an AnyPath Messaging System available from Lucent Technologies Inc., and a database (DB) 26 support the MSC 14. The VMS 24 provides conventional voice mail services for subscribers and also provides additional functions as will be described below. The database 26 may support records associated with each subscriber or may contain other data utilized in providing various call services. Also, a visitor location register (VLR) 20 and a home location register (HLR) 22 support the MSC 14. The VLR 20 identifies active wireless subscribers supported by the various base stations. The HLR 22 provides a primary or home location list of valid subscribers. When a subscriber is first sensed as active in the wireless system, the HLR 22 will normally be queried to authenticate the subscriber.

To facilitate communications and telephone calls outside of the wireless system, the MSC 14 is connected to the public switched telephone network (PSTN) 28. In this exemplary representation, the PSTN includes a switch 30 that is supported by a voice messaging system 32 and a service circuit node (SCN) 34. A consumer premises device (CPE) 36 such as a conventional telephone is shown connected to the PSTN 28 and supported by switch 30. The user 36 also employs a personal computer 38 with a modem to provide data communications for the user over the same telephone line that supports telephone 36. The personal computer 38 is provided as an example of a variety of devices capable providing data or integrated data and voice communications.

Figure 2:
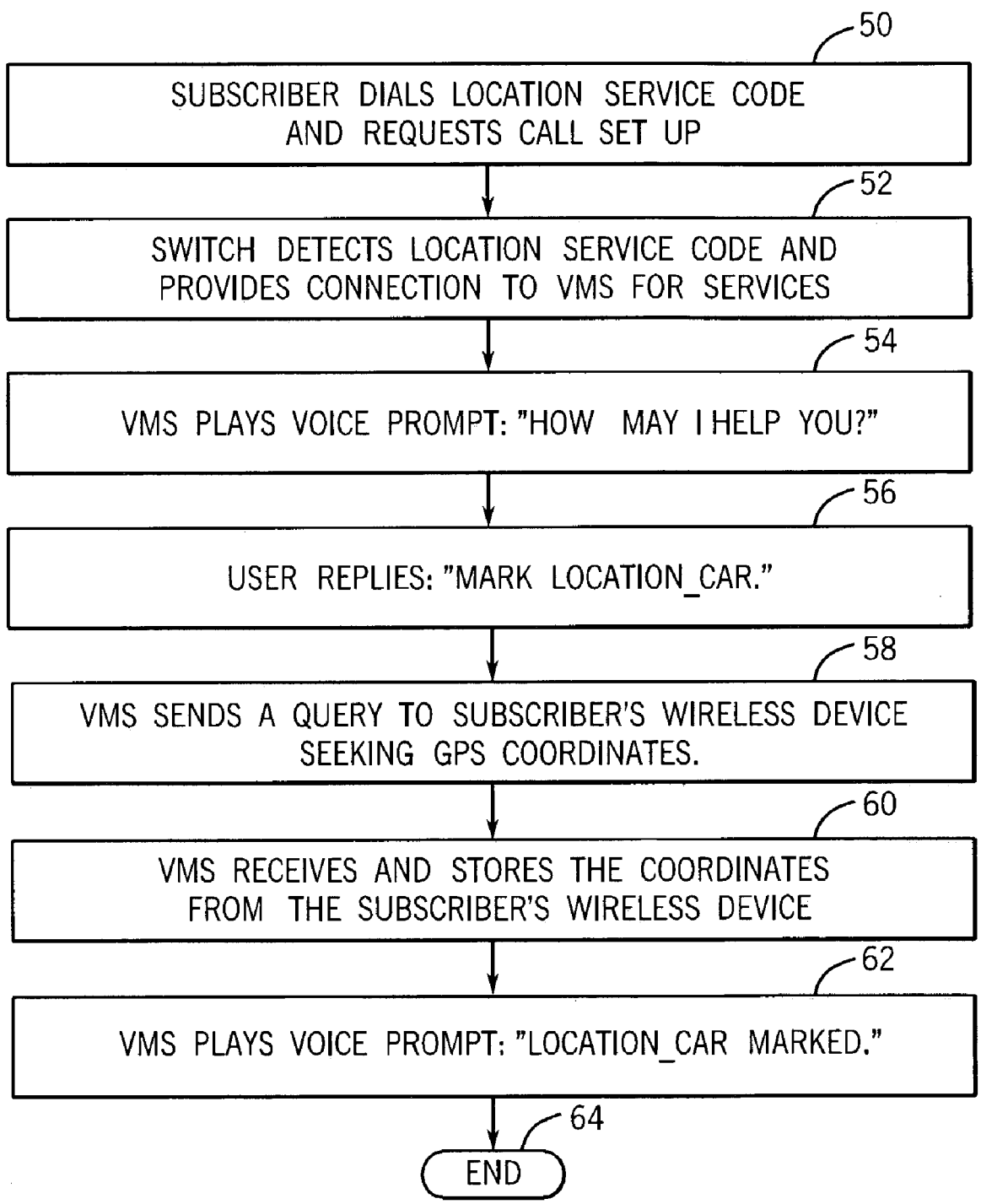
FIG. 2 is a flow diagram illustrating steps in accordance with an embodiment of the present invention for marking a location.

FIG. 2 illustrates steps of an exemplary method for remotely storing location information which in this example is the location of a parked car. The purpose for storing this information is to assist the subscriber in later finding the parked car. In step 50 the subscriber 10 dials a location service code, e.g. *86, and requests the origination of the call by pressing an appropriate button on wireless communication device 10. In step 52 the MSC 14 receives the call request, detects the location service code as a request for special services, and provides a connection to VMS 24 that will provide location services. In step 54 the VMS plays a voice prompt that is transmitted to the subscriber requesting services, such as "How my help you?". In response to the voice prompt, the subscriber replies: "Mark location_car." (the underscoring indicating a preferred pause in speech to permit easier speech recognition and emphasizing a distinction between the first phrase and the last word) in step 56. The VMS receives a reply and utilizes speech recognition to interpret the request where "Mark location" is a predetermined command phrase and "car" is a label use to identify a specific location to be marked and stored for later use. In response to this reply, the VMS sends a query to the subscriber's wireless device 10 seeking GPS coordinates in step 58. The subscriber's device 10 receives the query and transmits the current GPS coordinates. In step 60 the VMS receives and stores the location coordinates of the subscriber's wireless device. The VMS stores this location information internally or in an external database such as database 26 as a record associated with the subscriber, e.g. the subscriber's telephone number, and the associated label "car". In step 62 the VMS plays a voice prompt to the subscriber such as: "Location car marked." This process terminates at END step 64 with the tear down of the call initiated by the subscriber.

Figure 3:
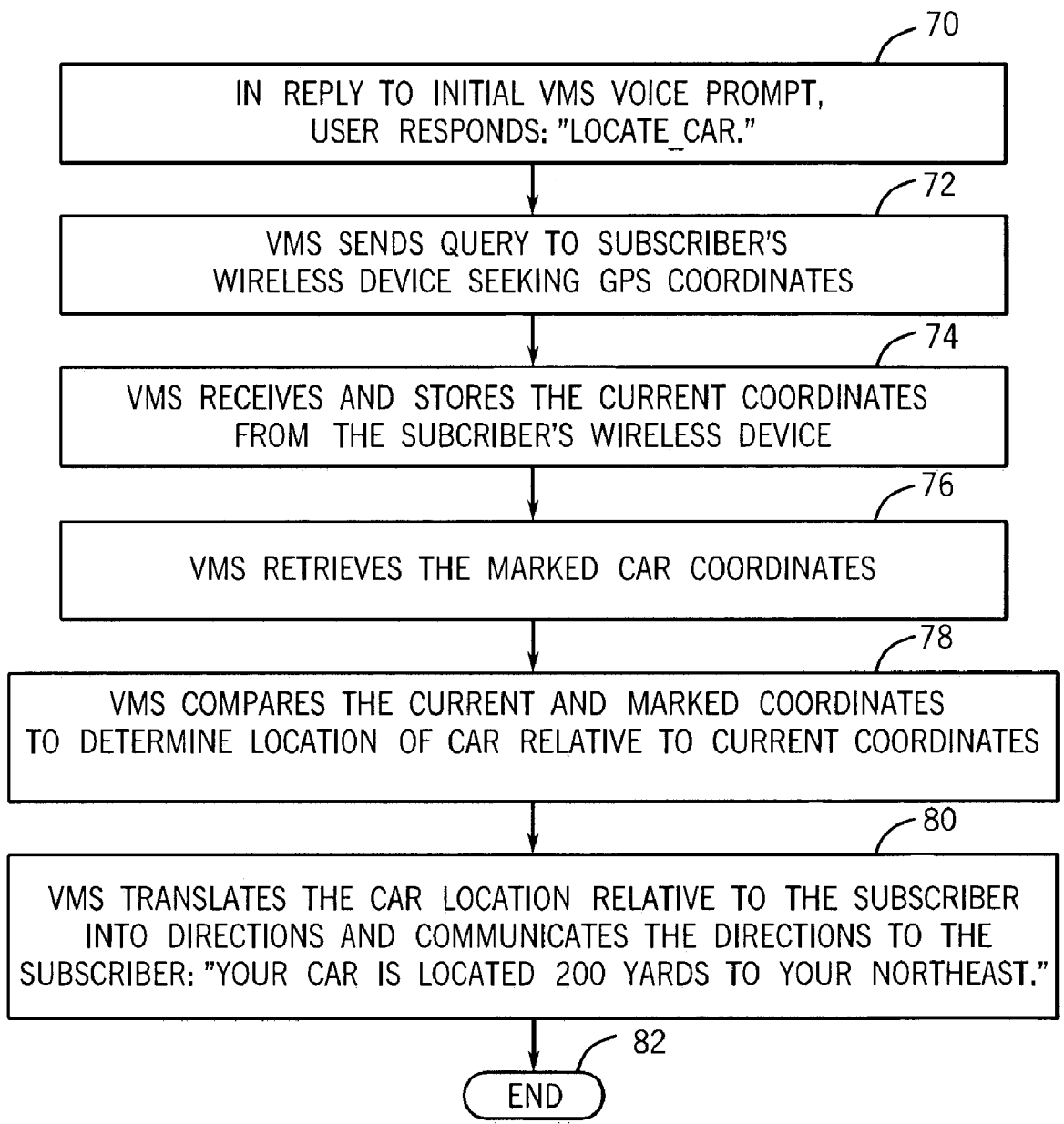
FIG. 3 is a flow diagram illustrating steps in accordance with an embodiment of the present invention for locating a previously marked location.

FIG. 3 illustrates steps of an exemplary method for retrieving remotely stored location information and utilizing it to obtain directions from a current location to the previously marked location. In this example the subscriber seeks assistance by again following steps 50, 52 and 54. Then in step 70, the subscriber replies to the VMS voice prompt by responding: "Locate_car." The VMS receives this reply and utilizes speech recognition to interpret the request where "Locate" is a predetermined command phrase and "car" is the label use to identify the specific location previously marked by the subscriber. In step 70 to the VMS sends a query to the subscriber's wireless device 10 seeking its current GPS coordinates. The subscriber's device receives the query and responds by transmitting its current GPS coordinates. In step 74 the VMS receives and stores the current coordinates from the subscriber's wireless device. In step 76 the VMS retrieves the previously marked (stored) GPS coordinates for "car". The record in the database containing this information can be accessed based on the identification of the subscriber's wireless device, e.g. using the calling party telephone number and/or electronic identification number of the wireless device, and the label "car" provided by the subscriber. The label "car" is used to distinguish the location of the subscriber's car from other locations that may also be stored for other uses by the same subscriber. In step 78 the VMS compares the current and marked coordinates to determine the location of the car relative to the current location of the subscriber. In step 80 the VMS translates the car location relative to the subscriber into directions and communicates the directions to the subscriber such as: "Your car is located 200 yards to your Northeast." The communications to the subscriber can be by voice such as generated by text-to-speech technology or could be in the form of text if the subscriber's wireless device is capable of displaying a text message. This process terminates at END step 82 with the tear down of the call initiated by the subscriber.

FIG. 4 illustrates another exemplary embodiment in which the subscriber's wireless communication device contains intelligence such as provided by a software program that provides additional capabilities as will be described. In step 100 the subscriber activates location application software on device 16. In step 102 the location software dials a location service code, e.g. *87, and requests a new call be established. In step 104 the MSC 14 detects the location service code and provides a connection to VMS 24 that supports location services. The reception of a predetermined location service code (*87) alerts the VMS 24 that the subscriber's wireless device 16 contains location intelligence. Following the reception of an acknowledgment signal from the VMS by the subscriber's device, the location application software on device 16 causes the device to transmit a message to the VMS requesting the current location of the subscriber's car to be marked in step 106. The message contains the GPS coordinates of the current location of the device and the "car" label to be associated with the coordinates. A series of predetermined labels such as car, boat, airplane, beach, etc. can be stored in the location application for selection by the user, or the user may enter an alphanumeric label using the keypad on the communication device. In step 108 the subscriber's wireless device receives acknowledgment from the VMS indicating that the message has been received. The process terminates at END 110.

FIG. 5 illustrates an exemplary embodiment of the use of remotely stored location information by a subscriber's wireless communication device that supports local location intelligence such as by a software program. This example assumes that the subscriber has previously stored location coordinates for the subscriber's parked car by using the locations services provided by the VMS. Before performing step 120, a location service call will have been established through the MSC 14 with VMS 24 such as previously described with regard to steps 100,102 and 104. In step 120 the subscriber causes the location program on the subscriber's communication device 16 to transmit a location service message to the VMS seeking the location of the subscriber's car. This message will include the current GPS coordinates of device 16 and the "car" label to identify the previously stored location coordinates associated with the location of the car. The current GPS coordinates are also temporarily stored at device 16. The location program on device 16 may permit the user to select one of a predetermined set of location labels or allow the user to input an alphanumeric label to be transmitted to VMS. On receiving the message from the device 16, the VMS in step 122 retrieves the previously stored GPS coordinates for the "car" and transmits a reply message to device 16 that contains the previously stored coordinates of the car. In step 124 the location application on device 16 receives the stored coordinates of the car. The location application on device 16 utilizes the stored coordinates and the current coordinates to select a map stored in memory for display to the user. The current location (current coordinates) and the location of the car (retrieved coordinates) are preferably each highlighted on the displayed map to provide location information to assist the user in finding the car. Preferably device 16 acknowledges receipt of the reply message to the VMS. The process terminates at END 126.

Transmitting the current GPS coordinates from device 16 to the VMS in step 120 is not required assuming that the device 16 has access to the current GPS coordinates and assuming that the location application on device 16 does not require additional assistance or information from the VMS other than the previously marked location (coordinates) of the parked car. However it may be desirable to transmit the current GPS coordinates from device 16 to the VMS in step 120 for other reasons. For example, it may be desirable to employ the same process utilized by the VMS to support two types of wireless communication devices: those that have the additional location intelligence, e.g. the ability to display a map showing the current and marked locations, and those that do not have the additional location intelligence.

Figure 6:
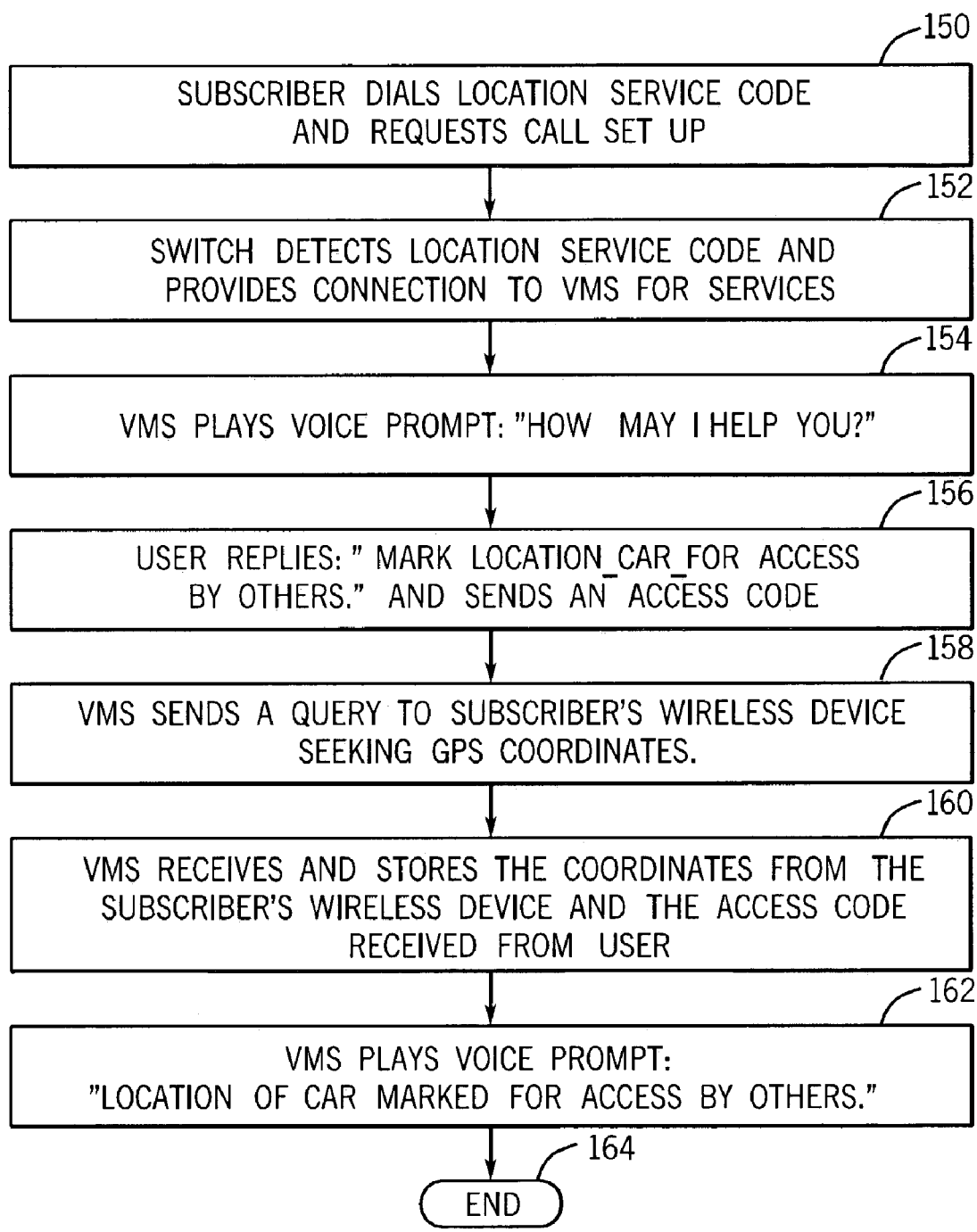
FIG. 6 is a flow diagram illustrating steps in accordance with an embodiment of the present invention for marking a location so that others may access the location information.

FIG. 6 illustrates another embodiment for remotely storing coordinates for later use in finding the location. This embodiment is substantially similar to the embodiment described with regard to FIG. 2 except that this embodiment permits access by a plurality of users to the stored location information. This embodiment is useful where different subscribers desire to find or meet at a common location as will be described in FIG. 7.

In step 150 the subscriber 10 dials a location service code and requests that a call be set up. In step 152 the MSC detects the location service code and provides a connection to the VMS to provide location services. In step 154, the VMS plays a voice prompt to the called party. In step 156, the user replies: "Mark location_car_for access by others." and sends an access code to the VMS. The VMS interprets "mark location" as a command instruction, "car" as a label to be associated with marked coordinates, and "for access by others" as a command instruction indicating that this information may be accessed by other users and that an access code to be received from the subscriber should also be stored as part of the record associated with the coordinates. The access code may comprise a numeric digit sequence, e.g. "1357", entered by the user that will have been previously selected and communicated to other subscribers that the user desires to grant access. In step 158 the VMS sends a query to the subscriber's wireless device seeking the current GPS coordinates. The device 10 receives this query and responds by transmitting the current coordinates. In step 160 the VMS receives and stores these coordinates in a record associated with the calling party wherein the record also includes the label "car" and the access code. In step 162 the VMS plays a voice prompt to alert the user that the location marking process has been successfully completed, e.g. "Location of car marked for access by others". The process terminates at END step 164.

Figure 7:
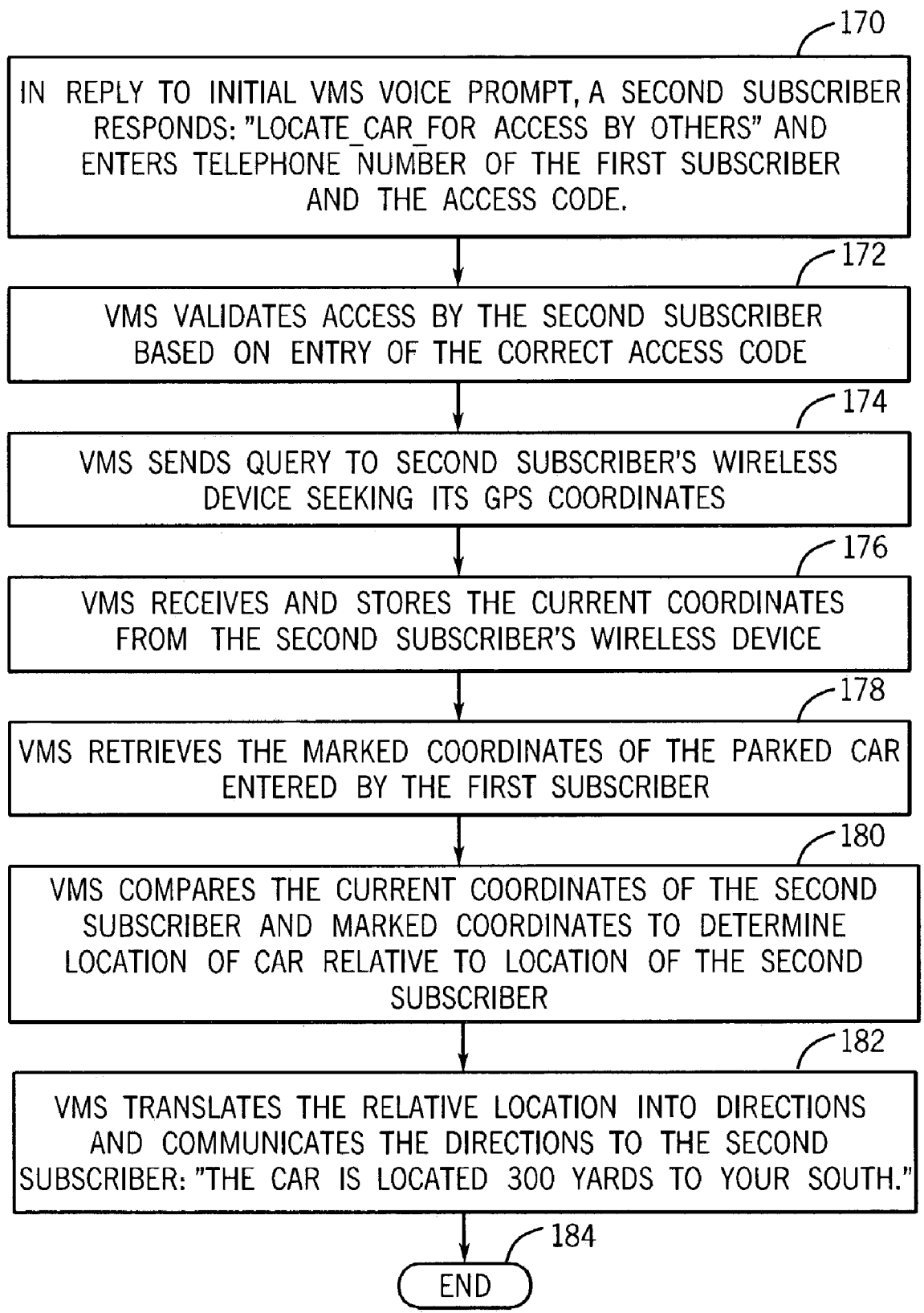
FIG. 7 is a flow diagram illustrating steps in accordance with an embodiment of the present invention for locating a previously marked location by other users.

FIG. 7 illustrates another exemplary embodiment in which remotely stored location coordinates input by a first subscriber are accessed by other subscribers in order to obtain location information. This embodiment is especially suited for situations in which a plurality of geographically separated subscribers desire to meet at a common location such as at a parked car or a location that is not known to all. The marked location may simply be the current location of the first subscriber who is at a sporting event where the other subscribers are to meet.

Prior to step 170, a second subscriber (one of the other subscribers in a group associated with a first subscriber) will have utilized his wireless device 16 to establish a call seeking location services from the VMS such as by executing steps 50, 52 and 54. In reply to the voice prompt received from the VMS, the second subscriber responds: "Locate_car_for accessed by others" and enters the telephone number of the first subscriber and the access code, i.e. 1357, previously obtained from the first subscriber. The VMS receives this information, identifies the corresponding record stored in the database based on the telephone number of the first subscriber, and in step 172 validates the second subscriber for access to the location information previously input by the first subscriber based on a correct access code. In step 174 the VMS sends a query to the second subscriber's wireless device seeking its current GPS coordinates. The device 16 of the second subscriber in response to receipt of the query transmits its GPS coordinates. In step 176 the VMS receives and stores the current coordinates from the second subscriber's wireless device. In step 178 the VMS retrieves the marked car coordinates entered by the first subscriber. In step 180 the VMS compares the current coordinates of the second subscriber and the marked coordinates entered by the first subscriber to determine the location of the car relative to the location of the second subscriber. In step 182 the VMS translates the relative location into directions and communicates the directions to the second subscriber such as by using text-to-speech processing to generate a spoken reply of: "The car is located 300 yards to your South". The process terminates at END step 184.

In an alternative embodiment the second subscriber is not required to know the label, e.g. "car", entered by the first subscriber since the access code will identify the record associated with the first subscriber to be accessed. It will be apparent that various types of known security and authentication techniques can be utilized to protect the location information entered by the first subscriber while still permitting other subscribers that are authorized to access the information.

Various changes and modifications to the described embodiments can be made. For example, the marked location coordinates can be stored and retrieved from various nodes in the network such as the HLR, database 26, and VMS 24. Further, PSTN switch 30 can be utilized instead of MSC 14 for handling calls requesting location service. VMS 32 or SCN 34 can be utilized instead of VMS 24 to provide the location services. It is also possible for MSC 14 or switch 30 to directly handle the location service requests if desired. Any subscriber with access to the telecommunication system can take advantage of the location services, such as a wireline user employing telephone 36 and modem equipped personal computer 38. However, it is envisioned that the location services will be most often utilized by wireless subscribers. The location services are not limited to voice communications and voice prompts. The location services may employ text based messaging such as short messaging services (SMS) as well as other communication formats such as character based communications carried by Internet protocol packets to provide communications both to and from a subscribers. Although coordinates generated by GPS receivers preferably integrated into wireless communication devices are described in the embodiments, it will be apparent that location coordinates could be generated by a separate GPS device, and that other techniques and the use of other types of location information could be utilized. Instead of providing a location service code to alert the switch that location services are desired, a predetermined telephone number such as an 800 toll-free number could be utilized wherein the termination of the telephone number provides the location service facilities.

Although embodiments of the invention have been described and shown in the drawings, the scope of the present invention is defined by the claims that follow.

We claim:

1. A method for storing location data input by subscribers in a telecommunication network for use in providing directions to locations determined by the location data, the method comprising the steps of:
    receiving a request, from a first subscriber device at a first location, for location services in the telecommunication network;
    in response to said request, establishing communications between the first subscriber device and a telecommunication node that supports location services;
    receiving at the node first location data that locates the first location, said first location data transmitted from the first subscriber device at the first location;
    storing the first location data in a record in a database in the telecommunication network, the record also containing an access code identifying the record associated with the first subscriber device;
    receiving at the node a request for directions to the first location from a second subscriber device operated by a second subscriber, the received request for directions including current location data corresponding to a current location of the second subscriber, the request for directions further including the access code;
    retrieving previously stored first location data corresponding to the first location by the node based on the access code from the second subscriber matching the access code entered by the first subscriber;
    comparing the first location data and the current location data at the node to determine the position of the first location data relative to the current location data;
    generating directions for traveling to the first location from the current location based on the first location data and the current location data;
    transmitting the directions from the node to the second subscriber, thereby providing the second subscriber with directions for proceeding from the current location to the first location.

2. The method according to claim 1 where the access code serves to validate requests from other users for access to the first location data.

3. The method according to claim 1 wherein the first location data comprises geographical coordinates determined by a global positioning satellite system.

4. A method for a second subscriber in a telecommunications system to obtain directions to a first location determined by previously stored first location data input by a first subscriber while at the first location, the method comprising the steps of:
    receiving a request, from a second subscriber telecommunication device at a second location, for location services in the telecommunication network;
    in response to said request, establishing communications between the second subscriber device and a telecommunication node that supports location services;
    receiving at the node a request from the second subscriber for directions to the first location, the received request for directions including current location data corresponding to a current location of the second subscriber, the request for directions further including identification of the first subscriber associated with the first location;
    retrieving previously stored first location data corresponding to the first location by the node based at least in part on the identification of the first subscriber;
    comparing the first location data and the current location data at the node to determine the position of the first location data relative to the current location data;
    generating directions for traveling to the first location from the current location based on the first location data and the current location data;
    transmitting the directions from the node to the second subscriber, thereby providing the second subscriber with directions for proceeding from the current location to the first location.

5. The method according to claim 4 wherein the step of receiving a request for directions comprises receiving an access code at the node transmitted from the second subscriber, comparing the access code received from the second subscriber with an access code previously entered and stored by the first subscriber, and granting the second subscriber access to the first location data if the access code entered by the second subscriber matches the access code previously entered by the first subscriber.

6. The method according to claim 4 wherein the step of receiving a request for directions comprises receiving a first label at the node transmitted from the second subscriber, the first label associated with the first location data and serving to differentiate the first location data from any other location data that the first subscriber may have previously stored.

7. The method according to claim 4 wherein the first location data comprises geographical coordinates determined by a global positioning satellite system.

8. The method according to claim 6 wherein the step of retrieving comprises the step of locating a record stored in a database based at least in part on the first label.

* * * * *